US006885728B2

(12) United States Patent
Hadland et al.

(10) Patent No.: US 6,885,728 B2
(45) Date of Patent: Apr. 26, 2005

(54) X-RAY SOURCE

(75) Inventors: Roger Hadland, Hertfordshire (GB); Alan Copeland Crawley, Hertfordshire (GB); Ian George Haig, Middlesex (GB); Paul Justin Keanly, Hertfordshire (GB)

(73) Assignee: X-Tek Systems Limited, Hertfordshire (GB)

( * ) Notice: Subject to any disclaimer, the term of this patent is extended or adjusted under 35 U.S.C. 154(b) by 0 days.

(21) Appl. No.: 10/332,786

(22) PCT Filed: Jul. 23, 2001

(86) PCT No.: PCT/GB01/03274

§ 371 (c)(1), (2), (4) Date: Jan. 10, 2003

(87) PCT Pub. No.: WO02/09481

PCT Pub. Date: Jan. 31, 2002

(65) Prior Publication Data

US 2003/0147498 A1 Aug. 7, 2003

(51) Int. Cl.[7] .................................................. H01G 1/34

(52) U.S. Cl. ....................... 378/138; 378/109; 378/113; 378/121

(58) Field of Search ................................ 378/101, 109, 378/110, 113, 117–119, 121, 122, 138

(56) References Cited

U.S. PATENT DOCUMENTS

| | | | | |
|---|---|---|---|---|
| 3,567,995 A | | 3/1971 | Lauritzen et al | |
| 3,683,191 A | * | 8/1972 | MacLachlan et al. | 378/114 |
| 4,253,048 A | | 2/1981 | Osako | |
| 4,553,255 A | | 11/1985 | Kanerva | |
| 4,646,338 A | * | 2/1987 | Skillicorn | 378/110 |
| 4,720,844 A | | 1/1988 | Bougle | |
| 4,777,642 A | * | 10/1988 | Ono | 378/138 |
| 5,132,999 A | * | 7/1992 | Wirth | 378/101 |
| 5,528,657 A | | 6/1996 | Vonk | |

FOREIGN PATENT DOCUMENTS

| | | | | |
|---|---|---|---|---|
| EP | 0 497 517 B1 | | 8/1992 | |
| EP | 0 497 517 A1 | | 8/1992 | |
| GB | 1 228 252 A | | 4/1971 | |
| JP | 59-132599 A | | 7/1984 | |
| JP | 06132145 A | * | 5/1994 | H01F/31/00 |

OTHER PUBLICATIONS

International Search Report of PCT/GB01/03274, dated Dec. 17, 2001.

International Preliminary Examination Report of PCT/GB01/03274, dated Oct. 17, 2002.

* cited by examiner

*Primary Examiner*—Edward J. Glick
*Assistant Examiner*—Chih-Cheng Glen Kao
(74) *Attorney, Agent, or Firm*—Christie, Parker and Hale, LLP

(57) ABSTRACT

A compact X-ray source is disclosed, improving controllability and insulation from unwanted high voltage effects. In one aspect, an active variable conductance device (130, 330) connected in series with the cathode is used in a closed loop, feedback arrangement to control the cathode beam current; the current flowing through the device to the cathode being directly sensed and compared with a desired current level. The result of the comparison is used to control the conductance of the device, thereby directly influencing the cathode current. A second aspect provides an extension of a Faraday cage, whereby the secondary winding of a transformer used to supply power to components within the cage is shielded within a coaxial, tubular member connected to the cage and extending outwardly from it.

20 Claims, 5 Drawing Sheets

X-RAY SOURCE

CROSS-REFERENCE TO RELATED APPLICATION

This application is a National Phase Patent Application of International Application Number PCT/GB01/03274, filed on Jul. 23, 2001, which claims priority of British Patent Application Number 0017976.2, filed Jul. 22, 2000.

FIELD OF THE INVENTION

This invention relates generally to the production of X-rays, and in particular, but not exclusively it relates to a compact X-ray source.

BACKGROUND OF THE INVENTION

A typical X-ray source comprises a thermionic source (typically a heated filament), a high-voltage supply to accelerate the electrons to a high energy, and a target made of a high atomic number metal.

FIG. 1 depicts a simple schematic diagram of a very basic and conventional X-ray source, although it will be realised that, in practice, much more complex arrangements are generally used, including the use of additional electrodes and magnetic fields to control and focus the electron beam Electrons are emitted thermionically from a hot cathode filament 30 under the action of an isolated heater supply 10 and are attracted to a metal target 70 via an intervening anode 60. The electrons are accelerated in a beam 50 towards the target due to a high potential difference between the filament and the anode/target arrangement established by means of a high voltage supply 20. On striking the target 70 the electrons stimulate X-ray emission by various processes, resulting in the emission of an X-ray beam 80.

Since it is desirable for the anode and target to be at, or substantially near, ground potential, the cathode filament must be at a very high negative potential with respect to ground Moreover, the cathode filament requires several watts of power to reach operable temperatures.

FIG. 2 shows a typical X-ray source arrangement where a cathode filament 30 is heated by a voltage supplied from an isolating transformer 11. Typically the voltage is between 2V and 6V, whilst the electrons are accelerated by a high voltage supplied from a multiplier 90, known as a Cockcroft-Walton voltage multiplier. The high voltage maybe in the range of hundreds of kilovolts, for example 160 kV.

It is often required to construct an X-ray source that is compact, and this requirement introduces or exacerbates various problems, for example those associated with providing accurate and effective control over the electron beam current, particularly where the source is desired to be capable of operating reliably with a low radiation output, and those associated with achieving sufficient insulation between various components.

Control over the current of the electron beam 50 is usually desirable with X-ray sources in general and, in low performance X-ray sources, this is frequently achieved merely by varying the temperature of the filament; relying upon the principle that a hotter filament emits more current than does a cooler one. In higher performance systems, exemplified in very basic form in FIG. 3, this is achieved by controlling the beam in the space charge limited regime by means of a field control electrode 40, often referred to as a focusing cup or Wehnelt. Such a focusing cup 40 is required to be at a negative potential with respect to the cathode filament in much the same way as the grid in a thermionic triode valve. The required potential can be supplied by either an electrically isolated bias supply, or self-biasing using a feedback resistor 120 between cathode filament 30 and focus cup 40. Current passing through the feedback resistor generates the required negative bias. However, such a negative feedback system has the drawback that it is difficult to adjust.

When conventional X-ray sources are required to operate at low electron beam current levels, a problem occurs in that electron current leakage from the cathode and focus cup becomes significant compared to the total electron beam current. Often this problem arises from cold cathode discharge (field emission), 'surface tracking' or other such problematic phenomena. Conventional X-ray sources measure the electron beam current with a current sensing circuit located at the end of the high voltage supply that is at ground potential (shown schematically as 25 in FIG. 4). A problem then arises in that any current measurement at this point in the system cannot differentiate between the actual thermionic electron beam current and the leakage current. This inability to separate the level of current leakage from the overall current measurement leads to variations in X-ray output since accurate control over the true electron beam current is not possible. Particularly where low radiation output levels are called for, variations in the measured electron beam current due to spurious factors such as those mentioned above can have a significant and adverse effect upon the radiation output levels and stability of operation.

Another problem with conventional X-ray sources arises from the high voltages required to accelerate the electron beam. When employing such extreme potential differences, there is always a risk of an electrical discharge or breakdown. When such phenomena occur, rapidly changing electromagnetic fields arise. Such fields induce large currents to instantaneously flow within the electronic circuitry of the X-ray source, and these currents can damage or destroy circuit components leading to X-ray source failure. A common solution to this problem is to enclose all susceptible components and circuitry within a Faraday shield to protect them from any rapidly changing fields.

In known X-ray sources, the integrity of the Faraday shield is compromised by the need to leave a conduit through which power and signals can be introduced into the circuitry. The break in the shield to provide a signal path also provides a pathway for signal interference during a high voltage breakdown. The integrity of the shield is particularly compromised by the use of isolating transformers that are generally used to introduce power and signals into the Faraday shield.

The present invention arose in an attempt to address some or all of the above problems.

SUMMARY OF THE INVENTION

According to one aspect of the present invention there is provided an X-ray source comprising: a high voltage power source; a cathode filament coupled to said high voltage power source; an active variable conductance device connected between the cathode filament and the high voltage power source; means for determining the amount of current flowing into said cathode filament through said variable conductance device and for providing a signal indicative thereof; and control means for utilising said signal to control said amount of current, thereby to control the current of an electron beam emitted from said cathode.

This current control arrangement differs significantly, in concept and effect, from conventional circuit schemes, which typically employ a separate DC supply for the grid voltage, floating at cathode potential. The voltage levels of such supplies require accurate control and stabilisation. It has been proposed in U.S. Pat. No. 5,528,657 to use such a series-regulating element to control the operative high voltage (anode/cathode) level, but this document does not teach series regulated control of the grid voltage level. The present invention also differs substantially, in concept and effect, from circuit arrangements for pulsed grid X-ray tubes, such as those disclosed in Japanese patent application No. 59132599. This document teaches the use of a transistor as a switch in the grid circuit to effect fast beam-switching with minimal overshoot and distortion of the current pulse.

Preferably, the active variable conductance device is a transistor, for example either a field effect transistor (FEI) or a bipolar transistor.

The active variable conductance device may alternatively comprise one or more light dependent resistors.

The control means advantageously comprises fibre optics and electro-optical devices, or any other optical link.

By using an active variable conductance device instead of a passive resistor as in the prior art, control over the electron beam current is greatly facilitated. Preferably, an optical link is used to control the variable conductance device, thereby reducing the risk of electromagnetic interference.

In a preferred embodiment, a current detector for detecting the current flow between the high voltage supply and the cathode filament is provided, either between the output of the high voltage power supply and the active variable conductance device or between the active variable conductance device and the cathode filament.

By measuring the current at this point, rather than at the ground end of the high voltage power source, discrimination between the true thermionic emission from the filament and all other forms of leakage current becomes possible. Hence the true thermionic emission current can be measured and controlled.

In accordance with a second aspect of the present invention, there is provided an X-ray source comprising a Faraday shield, in which electrical circuitry is housed, a high voltage power supply and an isolating transformer, wherein the isolating transformer is coaxially shielded; the shielding forming a continuation of the Faraday shield.

The isolating transformer is preferably in electrical connection with both an electron accelerating means and a cathode filament transformer, or other cathode filament supply means.

The first and second aspects of the invention are valuable individually, but a preferred embodiment comprises an X-ray source including both aspects of the invention.

The invention further provides an X-ray source or apparatus including any one or more of the novel features described or claimed herein.

BRIEF DESCRIPTION OF THE DRAWINGS

Embodiments of the present invention will now be described, by way of example only, and with reference to the accompanying schematic drawings, in which:

In all of FIGS. 1 to 7, identical reference numbers are used throughout to indicate similar components and features. In FIG. 8, however, features and components directly comparable with those in FIGS. 1 to 7 are given reference numbers increased by 200 over those used in the earlier figures.

DETAILED DESCRIPTION

Figure 1:
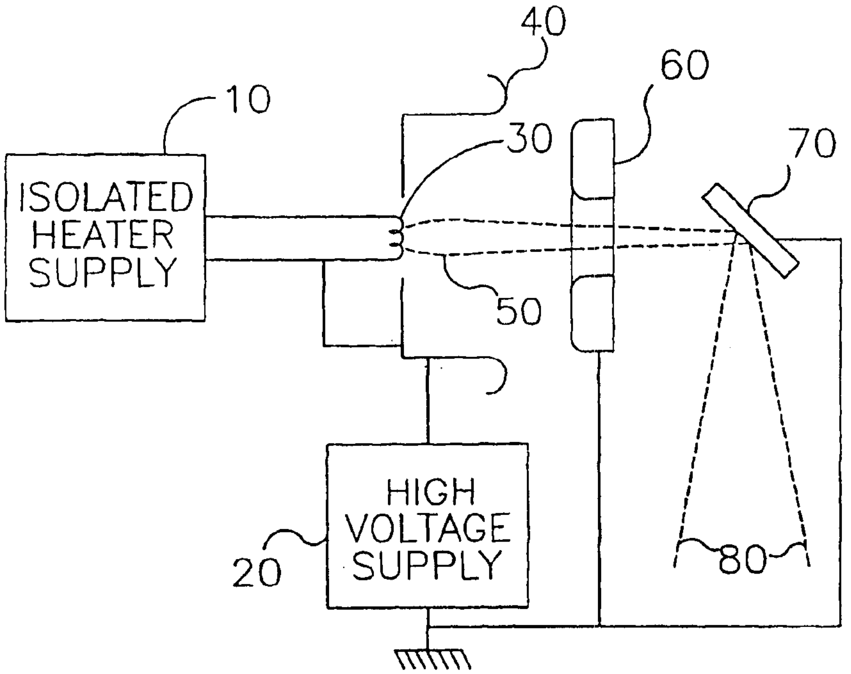
Fig. 1 (PRIOR ART)
FIG. 1 shows a conventional X-ray source circuit arrangement.

In the conventional X-ray source shown in FIG. 1, a cathode filament 30 is connected to an isolated power supply 10. Encircling the cathode filament 30, and connected to a high voltage supply 20, is a focusing cup 40. In operation, an electron beam 50 is accelerated through an annular anode 60 and focused onto a metal target 70 from which X-rays 80 radiate. The power supply 10 typically comprises an isolating step-down transformer (shown in FIG. 2 as 11), supplying around 6V to heat the cathode filament 30.

Figure 2:
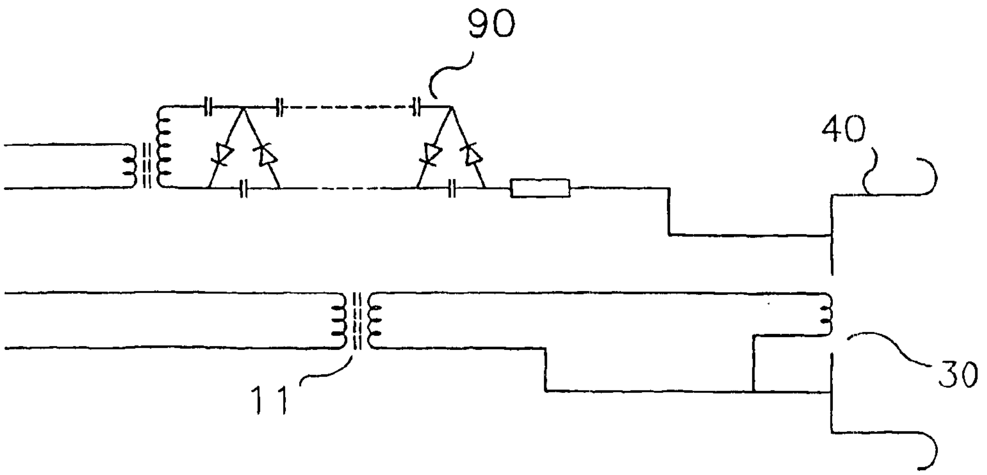
Fig. 2 (PRIOR ART)
FIG. 2 shows conventional cathode filament heating in an X-ray source incorporating a high voltage multiplier circuit and isolating heater transformer.

FIG. 2 shows a conventional X-ray source including a high voltage multiplier circuit 90 connected to the focusing cup 40. Here, an isolating transformer 11 is shown connected to the cathode filament 30. The multiplier 90 is otherwise known as a Cockcroft-Walton voltage multiplier 90. Most modem X-ray sources use this type of multiplier, the functioning of which is well known to persons skilled in the art.

Figure 3:
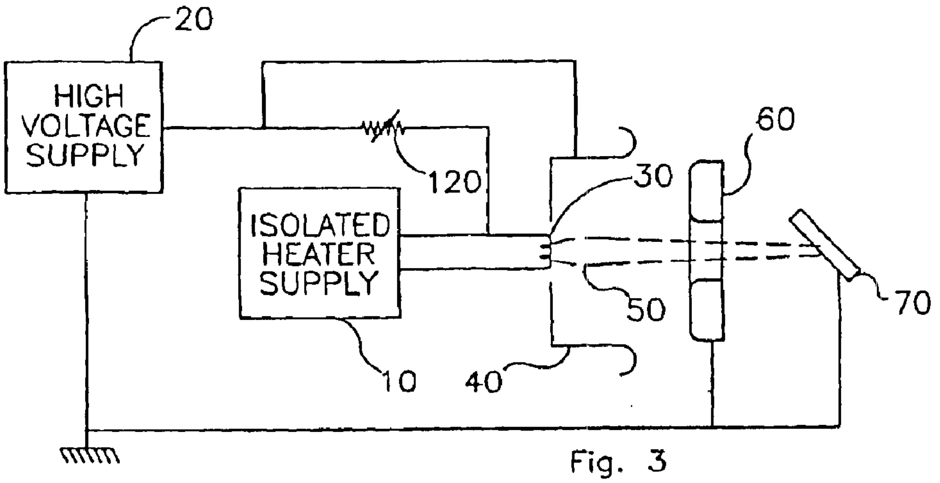
Fig. 3 (PRIOR ART)
FIG. 3 shows an X-ray source utilising negative feedback biasing.

Included in the conventional X-ray source shown in FIG. 3 is a variable feedback resistor 120, which is connected between the cathode filament 30 and the focusing cup 40. This configuration provides negative biasing to the focusing cup 40, thus ensuring that it remains at a negative potential as compared to the potential of the cathode filament 30. Biasing is essential if the focusing cup is to provide space-charge control of the electron beam current and is often alternatively provided by an isolated negative bias supply.

Figure 4:
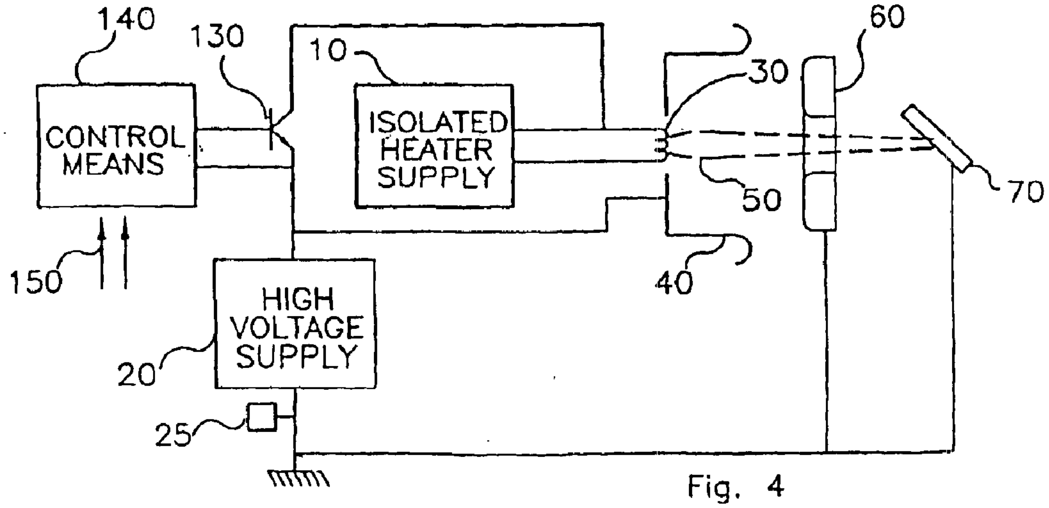
FIG. 4 shows an embodiment of an X-ray source in accordance with one example of the first aspect of the present invention.

A problem arising from the X-ray source of FIG. 3 stems from the difficulties associated with safely and precisely varying the value of the feedback resistor in order to maintain optimal control of the beam current. An embodiment of an X-ray source in accordance with the first aspect of the invention is shown in FIG. 4. Here, instead of a feedback resistor, an active variable conductance device 130 is employed. This device maybe a field effect transistor (FET) for example. Alternatively, a light dependent resistor (LDR) controlled by an optical link to vary the conductance can be used. Indeed, the reader will be aware that there are many other devices that may be suitable for the particular requirements of an application.

In the X-ray source of FIG. 4, the variable conductance device 130 is a bipolar transistor, controlled (by one of a variety of known methods) by a control circuit 140 in response to control signals 150. In the case where optical control is used, control signals 150 will be passed by one of a choice of known optical links such as a conventional fibre optic cable and transduced by suitable electro-optical devices such as light-emitting diodes (LEDs) and photodiodes. In this way it is possible to provide precise dynamic and inertialess control of the electron beam current.

Figure 5:
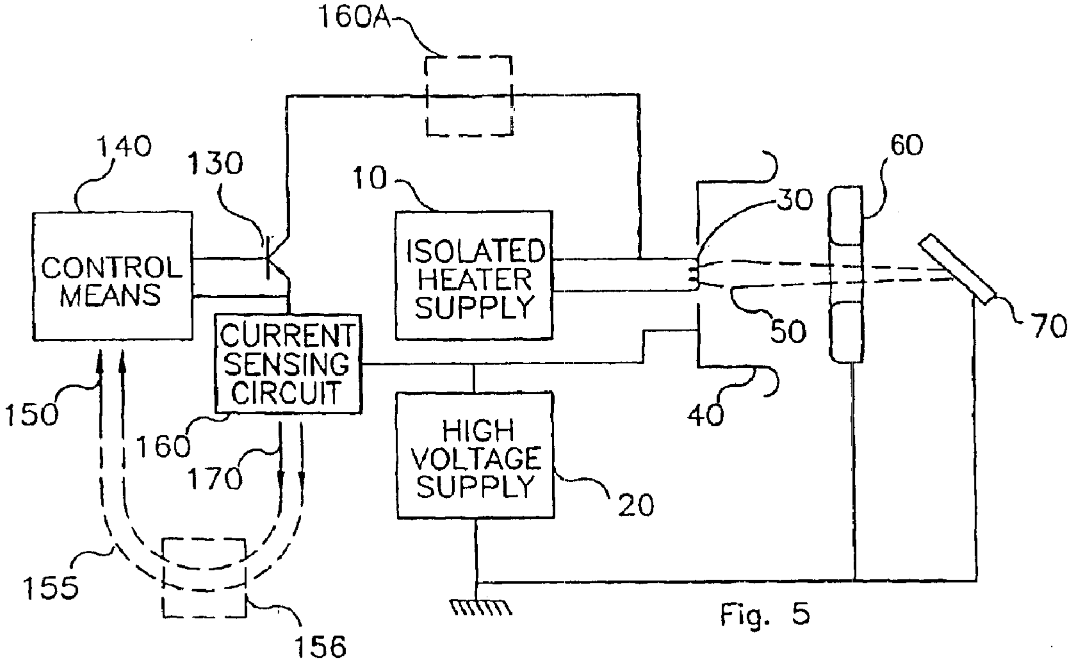
FIG. 5 shows a further embodiment of an X-ray source in accordance with another example of the first aspect of the present invention.

In a further embodiment of an X-ray source according to the first aspect of the arrangement, as shown in FIG. 5, a current sensing circuit 160 is employed to provide a measurable indication of the electron beam current. This circuit can include an LED, the luminance of which is directly proportional to the amplified electron beam current. The circuit generates control signals 170 that are used in feedback control of the variable conductance device 130, through control signals 150 and associated control circuit 140. (This feedback loop is shown schematically by the broken line 155). In practice, other components may be included in the feedback loop, and these components may include ground circuitry 156, so that signal 170 returns to ground and signal 150 is transmitted from ground. The current sensing circuit 160 is shown between the high voltage supply and the active conductance device. This current sensing circuit could instead be at a position indicated by 160A, between the active conductance device 130 and the filament 30.

The advantage of the above embodiment is that, in measuring the current flow at a point in the circuit shown in FIG. 5 by circuit 160 (or alternatively 160A), it is possible to differentiate accurately between the thermionic current flow and the leakage current which, as described earlier, can be influenced by many extraneous factors. Measured current values can then be used in a feedback control loop via optic link 150 to facilitate optimal adjustment of the biasing level. The current sensitive circuit 160 may take many different forms, and may be optical or electronic or otherwise. Many such means will be apparent to the skilled reader.

As discussed above, it is conventional to enclose all sensitive circuitry and components in a Faraday shield. However, it is not normally possible to completely electrically screen the components from potentially damaging electromagnetic fields, since a break in the Faraday shield is necessary to allow access to the circuit for power lines, control inputs etc.

Figure 6:
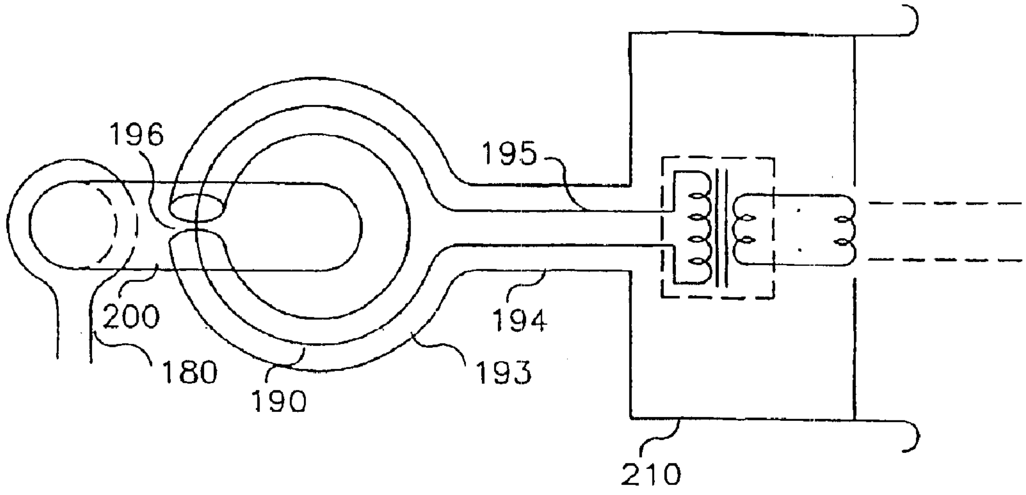
FIG. 6 shows an embodiment of an X-ray source in accordance with one example of the second aspect of the present invention.
Figure 7:
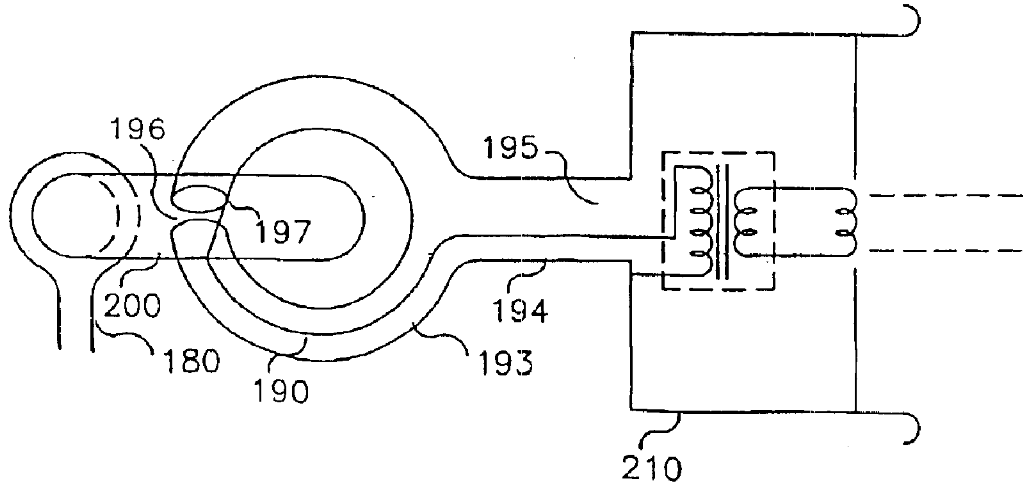
FIG. 7 shows a further embodiment of an X-ray source in accordance with another example of the second aspect of the present invention.

Referring to FIGS. 6 and 7, a transformer primary winding 180 is coupled to a transformer secondary winding 190 via a transformer core 200. The transformer secondary winding 190 feeds power into circuitry within a Faraday shield 210.

In an embodiment of the second aspect of the invention, a toroidal metal sheath 193 surrounds the transformer secondary winding 190, and extends as a tube 194 from the secondary circuit 190 towards the main Faraday shield 210. For practical shielding purposes, the toroidal sheath 193 and tube 194 form an integral part of the Faraday shield 210. Tube 194 serves as a conduit, screening wires 195 connecting (or continuing) winding 190 to circuitry within the Faraday shield. The toroidal sheath has a discontinuity, or electrical break, 196, preventing it from acting as a shorted turn. The discontinuity is, however, such that total shielding is still obtained.

FIG. 7 shows a variant of FIG. 6, in which the outer coaxial conductor forms part of the secondary winding; it connects to the secondary winding at point 197. Thus, the outer conductor forms part of the winding and its extension towards the Faraday shield.

It is to be noted that, in FIGS. 6 and 7, only one turn is shown for the primary and secondary windings, for clarity. In practice, more than one turn may be present for either or both of these.

Figure 8:
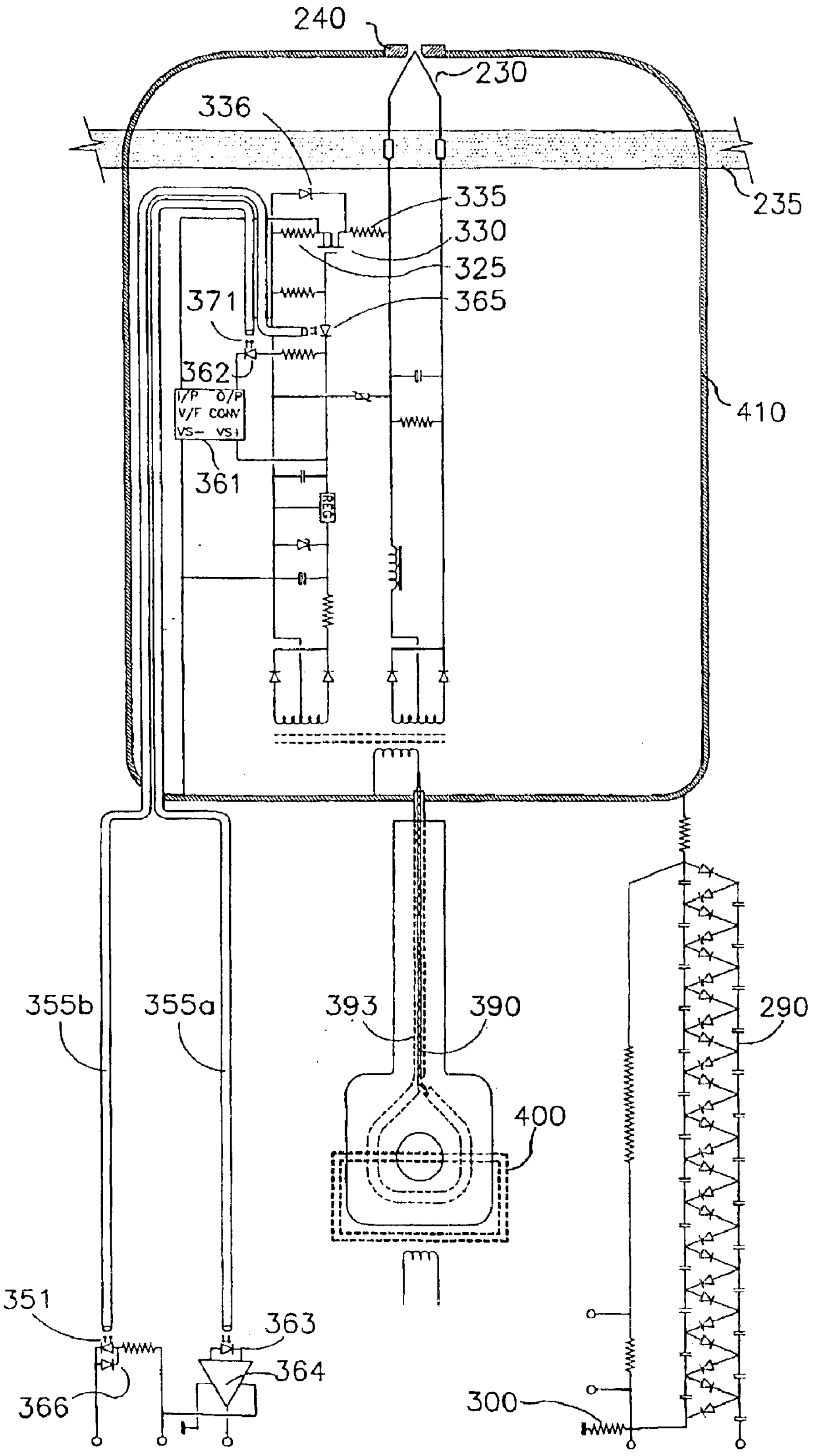
FIG. 8 shows a preferred embodiment of an X-ray source incorporating examples of both aspects of the invention.

Referring now to FIG. 8, there is shown a preferred embodiment of the invention in which developed forms of both aspects of the invention are incorporated into an integrated high voltage generator and x-ray source.

The electron beam is produced by thermionic emission from a cathode 230, which is made from tungsten wire or other material typically formed into the shape of a hairpin. In order for it to emit electrons, the cathode must be heated to incandescence. The required cathode temperature is produced by resistive self-heating. Electrons are extracted from the cathode 230 by means of an electric field applied, in known manner, between the cathode 230 and an anode (not shown in FIG. 8). As explained previously, the arrangement is such that the anode is at ground potential and the cathode is raised to a high negative potential. The magnitude of the beam current is controlled by a "bias" voltage imposed onto an annular grid electrode or Wehnelt 240 that surrounds the cathode. The bias voltage is always negative with respect to the cathode. The bias voltage also serves to produce a focussing electric field for the emitted electron beam, thereby controlling its diameter and ultimately the size of the x-ray source. The cathode 230 and the annular grid electrode 240 are, as is conventional, maintained in vacuum; the vacuum wall being shown in part as 235 in FIG. 8.

The grid bias voltage is obtained by a technique, known as self-bias, which is commonly used on triode devices including, in particular, electron microscopes. The electron beam current passes through a resistor connected between the grid and the cathode and develops, across the resistor, a voltage which constitutes the grid bias voltage. The system is thus self-stabilising and a separate power supply for the grid voltage is not required. The magnitude of the electron beam current depends on the size of the resistor and on physical characteristics of the gun which are geometry dependent.

In accordance with this embodiment, the resistor is replaced by a device whose resistance can be altered electronically. A preferred device is a Field Effect Transistor (FET) 330, but the principle of operation could also be implemented using other devices, such as light dependent resistors.

The beam current flows in series through a resistor 325, the FET 330 and a resistor 335. A Zener diode 336 protects the FET 330 from excessive voltage.

As discussed above, this arrangement differs significantly, in both concept and effect, from conventional circuit schemes, which typically employ a separate DC supply for the grid voltage floating at cathode potential, and which may utilise a series-regulating element for voltage control and stabilisation.

In conventional x-ray generators, the beam current sensing is typically achieved by measuring the current flowing at the bottom of the diode capacitor bank forming the high voltage multiplier (often called a Cockroft-Walton multiplier). In the present system, such a high voltage multiplier 290 is employed. A conventional sense resistor 300 is also shown. However, as described above, there is a serious disadvantage to using the voltage on sense resistor 300 as the means of measuring and controlling the electron beam current; namely that the current flowing at this point may include extraneous components in addition to the true electron beam current. These extraneous currents often include currents emitted from the vacuum facing surface of the housing surrounding the filament. The locations producing such emission are known as cold cathode or field emission sites, and are well known to those skilled in the art of the design of high voltage vacuum devices. Field emission sites are unstable and can be neither predicted nor eliminated If the control signal for beam current stabilisation is derived from a sense resistor 300 then the control of the true electron beam, that is emitted thermionically from the cathode 230, will be corrupted by the unquantifiable inclusion of extraneous currents from field emission sites. This makes stable control at low operating beam currents and high cathode voltages very difficult and degrades x-ray image quality under such conditions. The present invention permits the true current flowing from the cathode to be measured. This allows very precise control of the beam current even under usually difficult conditions, such as when operating at extreme high voltage with low beam currents, and even with field emission sites present.

The true electron beam current is sensed as a voltage across resistor 325 and is fed into an integrated circuit 361 configured as a voltage to frequency converter. The frequency output of integrated circuit 361 drives an LED 362, which sends a frequency modulated light signal 371 down an optical fibre 355*a*. At the other end of the fibre 355*a*, the optical signal is incident upon a photodiode 363. This converts the optical signal back into an electrical signal which accurately represents the measured electron beam current and is applied, via a buffer amplifier 364, to circuitry (not shown) which interfaces in a known manner with a computer. Computer commands input by a user of the system are used to effect adjustment of the electron beam current. However, if a computer is not used, appropriate circuitry is presented at a location convenient for direct or remote manual adjustment by an operator, thus allowing the beam current to be controlled, which may be either in real time, or to predetermined values.

It is necessary to provide a feedback signal for precise closed-loop control of the beam current against the predetermined demand level selected by the operator. Advantageously, since the resistance of the FET 330 may be varied by adjusting its gate voltage, this is accomplished by means of another photodiode 365 using optical signals 351 generated by a second LED 366; these optical signals 351 being amplitude modulated in a sense effective to indicate any desired change of the beam current. The signals are delivered into a second optical fibre 355*b*, the output of which illuminates the photodiode 365.

Optical fibres are used to provide electrical isolation between electronic circuits at the high and low voltage ends of the high voltage multiplier 290.

The current sensed on resistor 300 is not used for control or measurement, but may be used by circuits designed to protect the high voltage generator in the event of a fault causing excessively high current in the multiplier 290.

Occasional electrical discharges can be expected to occur within the x-ray source. Such discharges lead to rapidly changing transient currents, and it is necessary to protect active electronic components from the potentially damaging effects of radiated and conducted electromagnetic interference generated by these transients. The electronic circuits associated with the cathode and grid are contained in a metal walled chamber 410. The whole of this container is connected to the grid and is therefore at a very high voltage with respect to ground. This container provides very substantial screening for the sensitive circuits within it, and acts as a "Faraday shield".

Although it does not need to be hermetically sealed, the container is constructed in such a way that its openings are of minimal size. The integrity of such a Faraday shield may be compromised by the need to bring electrical signals in and out.

In this embodiment, the power for all of the circuits within the shield is provided by a high voltage isolation transformer. The secondary winding 390 of the transformer is insulated so as to provide the required high voltage isolation, and is constructed as a co-axial system. The outer conducting member 393 of this co-axial arrangement forms a continuous extension of the main Faraday shield 410. Furthermore, only the outer conductor of the co-axial arrangement winds around the transformer core 400.

The inner conductor 390 emerges from a hole in the side of the outer conductor and is then joined to the end of outer conductor 393. The length of inner conductor 390 and the size of the hole in the outer conductor 393 are kept very small. The co-axial self screening construction of the secondary winding ensures that conducted and radiated signals into the Faraday shield are so small that the reliability of the sensitive components housed within can be guaranteed.

The core 400 of the isolating transformer lies outside the boundary of the Faraday shield 410; only the outer co-axial member 393 of the secondary winding 390 is integrated into the continuum of the Faraday shield wall.

The Faraday shield may advantageously contain certain additional electronic circuits which might, for example, be used to monitor, control or stabilise the cathode filament voltage, current or power. Such circuitry, floating at high voltage, may also utilise fibre optics as the means of conveying signals to other electronic circuits operating near to ground potential.

What is claimed is:

1. An X-ray source comprising: an X-ray emissive target; a high voltage power source; a cathode filament and an anode electrode coupled to said high voltage power source; said cathode filament and said anode electrode being adapted to establish, in response to a beam current drawn by said cathode filament from said power source, a beam of electrons directed at said target; a control grid electrode; self-biasing means for generating a bias voltage for application to said control grid electrode to control the magnitude of said electron beam and to produce a focussing electric field for the electron beam; the self-biasing means including an active variable conductance device and sensing means for sensing said beam current and generating an indication of the magnitude thereof; means for conveying said indication to a remote location; means at said remote location for monitoring said beam current and determining adjustment required thereto; and control means for generating a control signal indicative of said adjustment and for applying said control signal to said active variable conductance device to control its conductance to vary the beam current, and thereby the magnitude of said electron beam, in accordance with said adjustment.

2. An X-ray source as claimed in claim 1, wherein the active variable conductance device is a transistor.

3. An X-ray source as claimed in claim 2, wherein the transistor is a field effect transistor or a bipolar transistor.

4. An X-ray source as claimed in claim 1, wherein the active variable conductance device comprises one or more light dependent resistors.

5. An X-ray source as claimed in any one or more of claims 1 to 4, wherein the control means comprises optical means.

6. An X-ray source as claimed in claim 5, wherein the optical means comprises fibre optics to pass optical signals and electro-optical devices for transducing optical signals into electrical signals and vice versa.

7. An X-ray source as claimed in claim 5, wherein said control means comprises means capable of generating a frequency-modulated optical signal indicative of the said beam current, means for conveying said frequency modulated optical signal to said remote location and means at said remote location for converting said optical signal into an electrical signal capable of being influenced by user input.

8. An X-ray source as claimed in claim 7, wherein a computer is provided at said remote location, capable of manipulation by the user to influence said beam current.

9. An X-ray source as claimed in claim 7, further comprising feedback means to transfer a control signal from said location to said active variable conductance device.

10. An X-ray source as claimed in claim 9, wherein said feedback means comprises optical means and said control signal comprises an amplitude-modulated light signal.

11. An X-ray source as claimed in claim 1, wherein a current detector for detecting current flow between the high voltage power supply and the cathode filament is provided between an output of the high voltage power source and the active variable conductance device, or between the active variable conductance device and the cathode filament.

12. An X-ray source as claimed in claim 11, wherein an output of the current detector is applied directly or indirectly to the control means.

13. An X-ray source as claimed in claim 1, further comprising a Faraday shield, in which electrical circuitry is housed, and an isolating transformer, wherein an isolating transformer winding is coaxially shielded, the coaxial shield forming a continuation of the Faraday shield.

14. An X-ray source as claimed in claim 13, wherein said isolating transformer winding comprises a secondary winding to which a primary winding of said transformer is coupled via a transformer core; the transformer secondary winding being arranged to feed power into circuitry within said Faraday shield.

15. An X-ray source as claimed in claim 14, wherein the coaxial shield is electrically connected to a winding.

16. An X-ray source comprising:

an X-ray emissive target;

a high voltage power source;

a cathode filament and an anode electrode coupled to said high voltage power source; said cathode filament and said anode electrode being adapted to establish, in response to a beam current drawn by said cathode filament from said power source, a beam of electrons directed at said target;

a control grid electrode;

self-biasing means for generating a bias voltage for application to said control grid electrode to control the magnitude of said electron beam and to produce a focussing electric field for the electron beam, the self-biasing means including an active variable conductance device and sensing means for sensing said beam current and generating an indication of the magnitude thereof;

means for conveying said indication to a remote location;

means at said remote location for monitoring said beam current and determining adjustment required thereto;

control means for generating a control signal indicative of said adjustment and for applying said control signal to said active variable conductance device to control its conductance to vary the beam current, and thereby the magnitude of said electron beam, in accordance with said adjustment; and a Faraday shield, in which electrical circuitry is housed, and an isolating transformer, wherein an isolating transformer winding is coaxially shielded, the coaxial shield forming a continuation of the Faraday shield, wherein said isolating transformer winding comprises a secondary winding to which a primary winding of said transformer is coupled via a transformer core; the transformer secondary winding being arranged to feed power into circuitry within said Faraday shield, and wherein said coaxial shield comprises a toroidal metal sheath surrounding the transformer secondary winding and extending as a tube from the secondary winding towards the Faraday shield; the toroidal sheath being formed with a discontinuity preventing it from acting as a shorted turn.

17. An X-ray source comprising:

an X-ray emissive target;

a high voltage power source;

a cathode filament and an anode electrode coupled to said high voltage power source; said cathode filament and said anode electrode being adapted to establish, in response to a beam current drawn by said cathode filament from said power source, a beam of electrons directed at said target;

a control grid electrode;

self-biasing means for generating a bias voltage for application to said control grid electrode to control the magnitude of said electron beam and to produce a focussing electric field for the electron beam, the self-biasing means including an active variable conductance device and sensing means for sensing said beam current and generating an indication of the magnitude thereof;

means for conveying said indication to a remote location;

means at said remote location for monitoring said beam current and determining adjustment required thereto;

control means for generating a control signal indicative of said adjustment and for applying said control signal to said active variable conductance device to control its conductance to vary the beam current, and thereby the magnitude of said electron beam, in accordance with said adjustment; and a Faraday shield, in which electrical circuitry is housed, and an isolating transformer, wherein an isolating transformer winding is coaxially shielded. the coaxial shield forming a continuation of the Faraday shield, wherein said isolating transformer winding comprises a secondary winding to which a primary winding of said transformer is coupled via a transformer core; the transformer secondary winding being arranged to feed power into circuitry within said Faraday shield, and wherein an outer conductor of the coaxial shield is connected to a secondary winding and thereby forms part of the secondary winding.

18. An X-ray source having an X-ray emissive target, a cathode filament, and an anode electrode comprising:

a Faraday shield, in which electrical circuitry is housed, a high voltage power supply, and an isolating transformer, wherein an isolating transformer winding is coaxially shielded, the coaxial shield forming a continuation of the Faraday shield, wherein said isolating transformer winding comprises a secondary winding to which a primary winding of said transformer is coupled via a transformer core; the transformer secondary winding being arranged to feed power into circuitry within said Faraday shield, and wherein said coaxial shield comprises a toroidal metal sheath surrounding the transformer secondary winding and extending as a tube from the secondary winding towards the Faraday shield; the toroidal sheath being formed with a discontinuity preventing it from acting as a shorted turn.

19. X-ray apparatus, comprising an X-ray source as claimed in claim 1 or claim 18.

20. An X-ray source having an X-ray emissive target, a cathode filament, and an anode electrode comprising:

a Faraday shield, in which electrical circuitry is housed, a high voltage power supply, and an isolating transformer, wherein an isolating transformer winding is coaxially shielded, the coaxial shield forming a continuation of the Faraday shield, wherein an outer conductor of the coaxial shield is connected to a secondary winding at a point and thereby forms part of the secondary winding.

* * * * *